United States Patent [19]

Mondshine et al.

[11] Patent Number: 5,238,065
[45] Date of Patent: Aug. 24, 1993

[54] PROCESS AND COMPOSITION TO ENHANCE REMOVAL OF POLYMER-CONTAINING FILTER CAKES FROM WELLBORES

[75] Inventors: Thomas C. Mondshine; Gerald R. Benta, both of Houston, Tex.

[73] Assignee: Texas United Chemical Corporation, Houston, Tex.

[21] Appl. No.: 912,282

[22] Filed: Jul. 13, 1992

[51] Int. Cl.$^5$ .......................................... E21B 37/00
[52] U.S. Cl. .................................. 166/300; 166/307; 166/312; 252/8.552; 252/8.553
[58] Field of Search .............. 166/281, 291, 300, 307, 166/312; 252/8.551, 8.552, 8.553

[56] References Cited

U.S. PATENT DOCUMENTS

| | | | |
|---|---|---|---|
| 2,221,353 | 11/1940 | Limerick et al. | 252/8.552 |
| 2,234,790 | 3/1941 | Zacher | 252/8.553 X |
| 3,516,496 | 6/1970 | Barkman, Jr. et al. | 166/281 |
| 3,529,666 | 9/1970 | Crowe | 166/312 X |
| 4,369,843 | 1/1983 | Mondshine | 166/305.1 X |
| 4,440,651 | 4/1984 | Weisrock | 166/274 X |
| 4,609,475 | 9/1986 | Hanlon et al. | 166/311 X |
| 4,620,596 | 11/1986 | Mondshine | 166/281 X |

Primary Examiner—George A. Suchfield
Attorney, Agent, or Firm—Roy F. House

[57] ABSTRACT

The invention provides a process for the removal of filter cakes containing one or more polysaccharide polymers and bridging particles from the sides of a borehole in a hydrocarbon-producing formation which comprises contacting the filter cake with a novel soak solution comprising an aqueous liquid, a peroxide selected from the group consisting of alkaline earth metal peroxides, zinc peroxide, and mixtures thereof, and an acidic substance to provide the soak solution with a pH in the range from about 1 to about 8, and optionally, an activator for the peroxide, for a period of time at least sufficient to decompose the polysaccharide polymers therein to such an extent that the filter cake forms a loosely adherent mass on the sides of the borehole, and thereafter contacting the filter cake with a wash solution in which the bridging particles are soluble to remove the remaining filter cake solids from the sides of the borehole. Preferably the aqueous liquid in the soak solution has no appreciable solubilizing effect on the bridging particles.

11 Claims, No Drawings

PROCESS AND COMPOSITION TO ENHANCE REMOVAL OF POLYMER-CONTAINING FILTER CAKES FROM WELLBORES

The use of fluids for conducting various operations in the boreholes of subterranean oil and gas wells which contact a producing formation are well known. Thus drill-in fluids are utilized when initially drilling into producing formations. Completion fluids are utilized when conducting various completion operations in the producing formations. Workover fluids are utilized when conducting workover operations of previously completed wells.

One of the most important functions of these fluids is to seal off the face of the wellbore so that the fluid is not lost to the formation. Ideally this is accomplished by depositing a filter cake of the solids in the fluid over the surface of the borehole without any loss of solids to the formation. In other words, the solids in the fluid bridge over the formation pores rather than permanently plugging the pores.

Many clay-free fluids have been proposed for contacting the producing zone of oil and gas wells. See for example the following U.S. patent: Jackson et al. U.S. Pat. No. 3,785,438; Alexander U.S. Pat. No. 3,872,018; Fischer et al. U.S. Pat. No. 3,882,029; Walker U.S. Pat. No. 3,956,141; Smithey U.S. Pat. No. 3,986,964; Jackson et al. U.S. Pat. No. 4,003,838; Mondshine U.S. Pat. No. 4,175,042; Mondshine U.S. Pat. No. 4,186,803; Mondshine U.S. Pat. No. 4,369,843; Mondshine U.S. Pat. No. 4,620,596; and Dobson, Jr. et al. U.S. Pat. No. 4,822,500.

These fluids generally contain polymeric viscosifiers such as certain polysaccharides or polysaccharide derivatives, polymeric fluid loss control additives such as lignosulfonates, polysaccharides or polysaccharide derivatives, and bridging solids.

After the wellbore fluid has completed its desired function, it is desirable to remove the filter cake before placing the well on production. When the bridging agent in the wellbore fluid is acid soluble, this is generally accomplished by displacing the wellbore fluid with a strongly acidic solution and allowing the acidic solution to contact the filter cake for a period of time which is sufficient to solubilize the bridging particles. These strongly acidic solutions require specialized equipment for their safe handling since they are extremely corrosive to equipment and on personal contact. When the bridging agent is water soluble, the wellbore fluid is displaced with a shale-inhibitive aqueous fluid which is undersaturated with respect to the water soluble bridging particles. This undersaturated fluid requires a long contact time to accomplish the solubilization of the water soluble bridging particles due to the encapsulating effect of the polysaccharide polymer or polymers present in the filter cake.

Processes are known in the art for removing polymeric materials from a porous media such as a subterranean formation. See for example the following U.S. patents: Hanlon et al. U.S. Pat. No. 4,609,475; Brost U.S. Pat. No. 4,846,981; McGlathery U.S. Pat. No. 4,871,022.

Thus there is a need for a process of removing the filter cake from the sides of a borehole penetrating a hydrocarbon-bearing subterranean formation which will be effective over a broad temperature range in relatively short periods of time, and which will be easy and safe to use.

It is an object of this invention to provide a process for the removal of a polymer-containing filter cake from the sides of a borehole in a hydrocarbon-containing subterranean formation which is effective, safe and which requires no special equipment.

SUMMARY OF THE INVENTION

The present invention provides a process for the removal of filter cakes containing one or more polysaccharide polymers and bridging particles from the sides of a borehole in a hydrocarbon-containing formation. The process comprises contacting the filter cake with a brine fluid comprising a peroxide selected from the group consisting of alkaline earth metal peroxides, zinc peroxide, and mixtures thereof, an aqueous brine, and an acidic substance to provide the soak solution with a pH in the range from about 1 to about 8, and, optionally, an activator for the peroxide for a period of time at least sufficient to decompose the polysaccharide polymers therein and to at least partially dissolve the bridging particles therein such that the filter cake is removed from the formation, and thereafter circulating said peroxide-containing fluid out of said borehole.

Preferably, the process comprises (1) contacting the filter cake with a soak solution comprising a peroxide selected from the group consisting of alkaline earth metal peroxides, zinc peroxide, and mixtures thereof, an aqueous liquid, and an acidic substance to provide the soak solution with a pH in the range from about 1 to about 8, and, optionally, an activator for the peroxide, for a period of time at least sufficient to decompose the polysaccharide polymers therein to such an extent that the filter cake forms a loosely adherent mass on the sides of the borehole, and (2) thereafter contacting the sides of the borehole with a wash solution to remove the remaining filter cake solids therefrom, wherein the soak solution has no appreciable solubilizing effect on the bridging particles, and wherein the bridging particles are soluble in the wash solution.

In a preferred embodiment wherein the bridging particles within the filter cake are water soluble, the aqueous liquid in the soak solution is an aqueous liquid in which the water soluble bridging particles are not soluble, preferably an aqueous liquid which is saturated with respect to the water soluble bridging material, and the wash solution comprises an aqueous liquid in which the water soluble bridging particles are soluble, hence which is unsaturated with respect to the water soluble bridging material.

In another preferred embodiment, the invention provides a composition for decomposing polysaccharide polymers contained within filter cakes on the sides of a borehole which comprise an aqueous liquid in which the bridging particles present in the filter cake are not appreciably soluble, a peroxide selected from the group consisting of alkaline earth metal peroxides, zinc peroxide, and mixtures thereof, an activator for the peroxide, and an acid substance to provide the composition with a pH in the range from about 1 to about 8.

While the invention is susceptible of various modifications and alternative forms, specific embodiments thereof will hereinafter be described in detail and shown by way of example. It should be understood, however, that it is not intended to limit the invention to the particular forms disclosed, but, on the contrary, the invention is to cover all modifications and alternatives falling within the spirit and scope of the invention as expressed in the appended claims.

The compositions can comprise, consist essentially of, or consist of the stated materials. The method can comprise, consist essentially of, or consist of the stated steps with the stated materials.

DETAILED DESCRIPTION OF THE EMBODIMENTS OF THE INVENTION

As is disclosed in Mondshine U.S. Pat. No. 4,369,843, incorporated herein by reference, it is desirable to remove the filter cake or seal from the surface of a borehole in a hydrocarbon-containing formation in order to obtain maximum hydrocarbon production. Thus if the bridging particles in the filter cake are water soluble as disclosed therein, it is disclosed that the bridging particles can be dissolved and removed by the flow of produced field brine or by the injection of water or an unsaturated saline solution. If the bridging particles are acid soluble or oil soluble, there are utilized strongly acid solutions or oil, respectively, to remove the bridging particles.

It has now been determined that the presence of polysaccharide polymers in the filter cake or seal substantially increases the time required to remove the filter cake due to the encapsulation of the bridging particles by the polysaccharide polymer, and that considerable polysaccharide polymer remains on the surface of the borehole after the bridging particles are removed. Furthermore, it has been determined that the present method of removing the filter cake, wherein a wash liquid in which the bridging particles are soluble is used, does not adequately remove all of the filter cake due to the breakthrough of the wash liquid through a portion of the filter cake resulting in the wash liquid then being lost to the hydrocarbon-containing formations. Thus the wash liquid not only doesn't adequately remove the filter cake, it also may harm the formation depending on its composition and other characteristics as is well known in the art.

The water soluble polysaccharide polymers which may be present in the filter cake may be any of such polymers well known in the art. See for example the book "Handbook of Water-Soluble Gums and Resins," Robert L. Davidson, Editor, McGraw-Hill Book Co., 1980, incorporated herein by reference. Representative polymers include water soluble salts of alginic acid, carrageenan, gum agar, gum arabic, gum ghatti, gum karaya, gum tragacanth, locust bean gum, tamarind gum, cellulose derivatives such as hydroxyethyl cellulose, hydroxypropyl cellulose, carboxymethyl cellulose, hydroxyethyl carboxymethyl cellulose, and the alkyl cellulose ethers, starch ether derivatives such as carboxymethyl starch, hydroxyethyl starch, hydroxypropyl starch, and crosslinked starch ethers, guar gum and its derivatives, such as hydroxypropyl guar, hydroxyethyl guar and carboxymethyl guar, biopolymers such as xanthan gum, gellan gum, welan gum, and the like. Usually the polysaccharide polymer is a cellulose ether, a starch ether which may be crosslinked, a modified guar gum, xanthan gum, gellan gum, welan gum, or mixtures thereof.

The invention is based on the discovery that a filter cake containing one or more polysaccharide polymers and bridging particles can be removed from the surface of hydrocarbon-containing formations by contacting the filter cake with a brine fluid comprising a peroxide selected from the group consisting of alkaline earth metal peroxides, zinc peroxide, and mixtures thereof, an aqueous brine, and an acidic substance to provide the soak solution with a pH in the range from about 1 to about 8, and, optionally, an activator for the peroxide for a period of time at least sufficient to decompose the polysaccharide polymers therein and to at least partially dissolve the bridging particles therein such that the filter cake is removed from the formation, and thereafter circulating said peroxide-containing fluid out of said borehole, wherein the bridging particles in the filter cake are solubilized by the filter cake contacting fluid and the fluids which subsequently contact the filter cake-free formation.

The invention is also based on the discovery of a two step method of removing filter cakes containing one or more polysaccharide polymers and bridging particles from the surface of hydrocarbon-containing formations which first decomposes the polysaccharide polymers without substantial solubilization of the bridging particles, and subsequently which solubilizes the bridging particles and removes the filter cake leaving substantially no polymer residue on the surface of the formation.

For the purpose of the present disclosure, the term "filter cake" is hereinafter intended to mean the filter cake or seal which is present on the surface of a hydrocarbon-containing subterranean formation, i.e., the filter cake on the sides or face of a borehole within the formation, and which contains bridging solids and one or more polysaccharide polymers. Also the term "aqueous brine" is intended to mean an aqueous solution containing one or more salts dissolved therein, such as potassium chloride, sodium chloride, ammonium chloride, and the like, and includes sea water.

The preferred process of the invention for the removal of the filter cake comprises contacting the filter cake with a novel soak solution of this invention which comprises an aqueous brine which has no appreciable solubilizing effect on the bridging solids, a peroxide selected from the group consisting of alkaline earth metal peroxides, zinc peroxide and mixtures thereof, and an acidic substance to provide the soak solution with a pH in the range from about 1 to about 8, for a period of time at least sufficient to decompose the polysaccharide polymers therein to such an extent that the filter cake forms a loosely adherent mass on the surface of the formation, and thereafter contacting the filter cake with a wash solution in which the bridging particles are soluble to remove the remaining filter cake solids. Preferably the soak solution contains an activator for the peroxide as disclosed hereinafter.

It is preferred that the soak solution have no appreciable solubilizing effect on the bridging particles within the filter cake. This prevents the premature breakthrough of the soak solution through a portion of the filter cake and, hence, allows all of the filter cake to be contacted by the soak solution until the peroxide has decomposed the polysaccharide polymers substantially. If the bridging particles are water soluble, preferably the aqueous liquid in the soak solution will be saturated with respect to the bridging particles. Thus if the bridging particles are sized sodium chloride, the aqueous liquid will preferably be saturated with respect to sodium chloride. Additionally, the soak solution should have a density which is compatible with the density of the liquid in the borehole which the soak solution displaces in order to minimize mixing of the soak solution with the liquid. Preferably the soak solution contains inorganic water soluble salts dissolved therein in amounts up to saturation to provide the desired density.

Typical salts are generally selected from the group consisting of sodium chloride, sodium bromide, potassium chloride, potassium bromide, calcium chloride, calcium bromide, zinc chloride, zinc bromide, and mixtures thereof. Certain of these salts are acidic, and, thus, they may also function as acidic substances to provide the required pH.

It is preferred that the soak solution be solids-free, i.e., contain no appreciable content of suspended solids, thus contains essentially only dissolved substances. The soak solution may be filtered using procedures well known in the art of using clear brine fluids, if desired.

The peroxides which are useful in this invention are selected from the group consisting of alkaline earth metal peroxides, zinc peroxide, and mixtures thereof. The preferred alkaline earth metal peroxides are calcium peroxide, magnesium peroxide, strontium peroxide, and barium peroxide. The preferred peroxide due to availability and cost is calcium peroxide.

Alkaline earth peroxides and zinc peroxide are known water insoluble compounds. See for example the following references, incorporated herein by reference: (a) "Peroxides, Superoxides, and Ozonides of Alkali and Alkaline Earth Metals," Il'ya Ivanovich Vol'nov (Translated by J. Woroncow, Edited by A. W. Petrocelli), Plenum Press, New York, 1966; (b) "Kirk-Othmer Encyclopedia of Chemical Technology," Third Edition, Vol. 17, John Wiley & Sons, 1982, pp. 1-26.

Inorganic peroxide compounds are commonly described as compounds whose structures include the peroxo-group, —o—o—. Simple peroxide compounds include peroxides in which the peroxo-group is bonded to a metallic atom via ionic bonding, and includes hydroperoxides characterized by the presence of the hydroperoxyl ion $(HO_2)^-$. Complex peroxide compounds include peroxides in which the peroxo-group as such, or in the form of $H_2O_2$ and $HO_2$, is bonded to the metallic atom by a covalent bond. Complex peroxide compounds also include the addition compounds formed with crystallized hydrogen peroxide.

The characteristic properties of peroxide compounds both simple and complex, are: the formation of hydrogen peroxide upon reaction with dilute acid solution, the liberation of oxygen as a result of thermal decomposition, and the liberation of oxygen upon reaction with water and other chemical agents. Further characterization is possible by dividing the simple inorganic peroxide compounds into four groups: (1) hydroperoxide, characterized by the $(HO_2)^-$ ion; (2) peroxides, characterized by the $(O_2)^{2-}$ ion; (3) superoxides characterized by the $(O_2)^-$ ion; and (4) ozonides, characterized by the $(O_3)^-$ ion.

The hydrolysis of peroxides and hydroperoxides proceeds as follows:

$$MO_2 + 2H_2O \rightarrow M(OH)_2 + H_2O_2$$

and

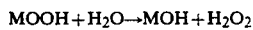

$$MOOH + H_2O \rightarrow MOH + H_2O_2$$

where M=metal. For this reason, peroxides and hydroperoxides are considered as being derived from hydrogen peroxide by replacement of one or both the hydrogen atoms by metal atoms.

Complex peroxide compounds include peroxyhydrates, for example, $CaO_2.2H_2O_2$, and peroxyhydrate hydrates, for example, $BaO_2.H_2O_2.2H_2O$.

Peroxides of calcium, strontium and barium belong to the $M^{2+}O_2^{2-}$-type of peroxide compounds, while peroxides of magnesium and zinc, of general formula $MO_2.xH_2O$, probably belong to the HO—M—OOH type where the covalent bond between the hydroperoxyl group and the metal atom is the same as that in hydrogen peroxide.

Calcium peroxide is generally prepared by industrial processes which provide a product containing 60-75 wt. % $CaO_2$. Reaction of $CaO_2.8H_2O$ with solutions containing greater than 20 wt. % of hydrogen peroxide results in the formation of calcium peroxyhydrate, $CaO_2.2H_2O_2$. Strontium peroxide, industrial grade, generally contains 80-95% $SrO_2$. Industrial grade barium peroxide generally contains up to about 90% $BaO_2$. Depending on its method of production, industrial grade magnesium peroxide contains from about 25% $MgO_2$ to about 50% $MgO_2$ and generally is a mixture of peroxide, oxide, and magnesium oxide hydrate. Industrial grade zinc peroxide contains about 55% $ZnO_2$.

For all purposes of the present invention, the term "peroxide" includes all forms of the disclosed peroxides, including simple peroxides, such as hydroperoxides characterized by the $(HO_2)^-$ ion and peroxides characterized by the $(O_2)^-$ ion, and complex peroxides such as peroxyhydrates and peroxyhydrate hydrates.

The peroxide is insoluble in water, hence an acidic substance must be added to the soak solution to provide the soak solution with a pH in the range from about 1 to about 8, preferably from about 1 to about 6. Any acidic substances may be added which will provide the desired pH. Preferably the acidic substance will react with the peroxide to produce a substantially clear solution. "Acid" or "acidic substance" as used interchangeably in this disclosure and claims is intended to mean any substance or mixture of substances which will dissolve in the soak solution to produce a pH in the range from about 1 to about 8. Representative acidic substances include hydrochloric acid, phosphoric acid, formic acid, acetic acid, proprionic acid, glycolic acid, sulfamic acid, citric acid, aluminum chloride, zinc chloride, zinc bromide, calcium bromide, ferric chloride, sodium dihydrogen phosphate, sodium acid pyrophosphate, acidic buffers, and the like. Sulfamic acid is preferred.

The concentration of peroxide in the soak solution used in the practice of the invention will vary depending on the oxidation characteristics of the polysaccharides in the filter cake and on the temperature of the filter cake. Thus the temperature of the soak solution will increase as it contacts the filter cake, and the increased temperature will enhance the reaction rate. Generally the concentration of peroxide will be in the range from about 2.8 kg/m³ to about 57 kg/m³, preferably from about 8 kg/m³ to about 28 kg/m³.

It is optional but preferred to use an activator to further activate the peroxide and/or to increase the rate of reaction between the peroxide and the polysaccharide. Known activators include iron and copper salts as well as salts of other transition metals, such as soluble ferrous, cuprous, cobaltous, nickelous, manganous, and the like, salts. The activator must be soluble in the soak solution. The preferred metallic cation activator is a source of the ferrous cation, such as ferrous sulfate, ferrous ammonium sulfate, ferrous chloride, and the like. The amount of activator, if used, is not critical and need only be sufficient to provide the desired rate of reaction. Generally, a metallic cation activator will be present in an amount from about 0.00025% to about 0.0025% by weight of the soak solution.

Other activators which are effective in the present invention have been discovered to be water soluble organic hydroxyl compounds having the empirical formula $$HO-C_aH_{2a}-Z$$

where a is an integer from 1 to about 5, and Z is a radical selected from the group consisting of H, OH, and $(OC_bH_{2b})_nOR$ where b is 2, 3, or mixtures thereof, n is an integer from 0 to about 3, and R is a radical selected from the group consisting of H, $C_xH_{2x+1}$, and $C_yH_{2y+1}CO$, where x is an integer from 1 to 5 and y is an integer from 1 to 3. Preferably a=2 or 3, and $Z=(OC_bH_{2b})_nOR$ provided that when n=o, $R=C_xH_{2x+1}$. Thus it is preferred that the water soluble hydroxy-containing organic compound activator contain at least one ether group or radical within its molecular structure. Generally, a water soluble organic hydroxyl compound activator will be present in the soak solution in an amount from about 0.1% to about 2.5% by volume, preferably from about 0.2% to about 1.0% by volume.

If desired, the peroxide can be used in conjunction with known oxidizers for aqueous fluids containing polysaccharide polymers, such as persulfates, percarbonates, perborates, peroxydiphosphates, hypohalites, alkali metal and hydrogen peroxides, and the like.

The soak solution contacts the filter cake for a period of time which is at least sufficient to decompose the polysaccharide polymers in the filter cake to such an extent that the filter cake becomes a loosely adherent mass of bridging particles. The higher the formation temperature, and hence, the higher the temperature to which the soak solution is heated, the lower the time required to contact the filter cake with the soak solution. Generally, the soak solution will contact the filter cake from one to ten hours. Thereafter the filter cake is contacted with a wash solution to remove the remaining filter cake solids, principally the bridging particles and any remaining polymers and polymer degradation products.

The wash solution is one in which the bridging particles are at least partially soluble. Thus if the bridging solids are water soluble, the wash solution is undersaturated with respect to the bridging solids. If the bridging solids are acid soluble, a suitable acidic solution is used as the wash solution. If the bridging solids are oil or solvent soluble, a suitable oil or solvent is used as the wash solution.

It is preferred that the wash solution have no appreciable effect on the permeability of the hydrocarbon-containing formation. Thus aqueous solutions containing one or more salts which inhibit the swelling and/or dispersion of particles within the formation are preferred. Representative of such salts are potassium salts, such as potassium chloride and potassium acetate, ammonium chloride, quaternary ammonium salts of low molecular weight, such as tetramethyl ammonium chloride, tetraethylammonium chloride, and in general tetraalkylammonium salts in which the alkyl groups independently contain from 1 to about 4 carbon atoms, and other salts as is known in the art. Preferably the wash solution will contain from about 0.05% to about 10% by weight of the salt, most preferably from about 0.1% to about 5%.

It is particularly preferred that the wash solution contain from about 2% to about 5% by weight potassium chloride or ammonium chloride.

The following is a typical embodiment of the process of this invention. The process is to be implemented after the borehole has been drilled and the completion fluid and all production tools are in place in the hydrocarbon-containing section of the open hole. The completion fluid is assumed to have contained one or more polysaccharide polymers therein such as xanthan gum and epichlorohydrin crosslinked hydroxypropyl starch, and sized sodium chloride bridging particles in a brine saturated with respect to sodium chloride. In the case illustrated hereinafter, it is assumed that a 1259 kg/m$^3$ fluid is required for well control.

1. Prepare the following fluids:
   a. SPACER FLUID (Typically about 8 m$^3$):
   Prepare a polymer-viscosified spacer push pill by adding 8.57 kg/m$^3$ biopolymer, such as xanthan gum, to 1259 kg/m$^3$ calcium chloride solution, preferably saturated with respect to sodium chloride by the addition of 37 kg/m$^3$ of sodium chloride thereto.
   b. DISPLACEMENT FLUID (Typically about 8 m$^3$):
   Calcium chloride solution having a density of 1259 kg/m$^3$, preferably saturated with respect to sodium chloride by the addition of 37 kg/m$^3$ of sodium chloride thereto.
   c. BREAKER FLUID (Typically about 6.35 m$^3$):
   Prepare sufficient volume of breaker solution to fill the open-hole section of the borehole as follows: Add 35.7 kg/m$^3$ sulfamic acid and 14.28 kg/m$^3$ alkaline earth peroxide breaker to a 1259 kg/m$^3$ calcium chloride solution, preferably saturated with respect to sodium chloride by the addition of 37 kg/m$^3$ of sodium chloride thereto, and preferably, adding about 0.6 volume % of ethyleneglycolmonobutylether as an activator for the peroxide.
   d. WASH PILL (Typically about 28.6 m$^3$):
   Prepare a 1139 kg/m$^3$ calcium chloride solution.
   e. WASH FLUID (Typically about 47.5 m$^3$):
   Prepare a 1259 kg/m$^3$ calcium chloride solution. It is preferred that all of the fluids be filtered, such as through diatomaceous earth, as is well known in the art of solids free completion fluids.

2. Displace the salt-polymer completion fluid from the hole with the viscosified spacer fluid (a) followed by the displacement fluid (b).

3. Spot the breaker fluid (c) in the open-hole section to cover the salt-polymer filter cake on the sides of the borehole. Follow the breaker fluid with the wash pill (d).

4. Soak the filter cake for one to six hours (the soak time decreases as the temperature increases).

5. Circulate out the breaker fluid and the wash pill with the wash fluid (c) keeping the formation pressure under control by circulating under choke.

6. Wash the open hole by circulating the wash fluid until the filter cake is removed from the formation. Look for loss of fluid volume to indicate clean up of the filter cake.

The invention will be understood in light of the following specific examples, which are merely illustrative and should not be construed as limiting the invention in any respect, as will be evident to those skilled in the art.

In the examples to follow, the procedure used to prepare the filter cake and the laboratory procedure used to illustrate the process of removing the filter cake are as follows:

Filter Cake Deposition:

1. Select a 44.45 mm aloxite disk of 5 darcy permeability.
2. Permanently glue a "handle" to the disk to allow handling of the disk without disturbing the filter cake.
3. Attach the disk to the bottom of an API filter cell with a non-permanent "glue" such as silicone sealant.
4. Pour the fluid from which a filter cake is to be prepared into the API cell.
5. Pressure the cell to 100 psi and filter the fluid through the aloxite disk for 16 hours.
6. Empty the API cell and pry the aloxite disk off the bottom of the API cell while being careful not to disturb the filter cake.

Test Procedure:

1. Glue the aloxite disk on which the filter cake was deposited to the inside of a pint jar lid.
2. Screw the lid with the aloxite disk attached onto a pint jar filled with the soak solution heated to the desired soaking temperature.
3. Invert the pint jar and place it in a water bath or constant temperature oven set at the desired soaking temperature for the desired soaking time. The soak time can be varied to determine the optimum time for soaking.
4. Transfer the pint jar lid containing the aloxite disk to a pint jar containing the wash solution. The wash solution is a 3% by weight potassium chloride solution unless otherwise indicated.
5. Roll the pint jar in a roller oven at the soaking temperature.
6. Check the filter cake every 5 minutes to determine the time required to clean the disk. The disk is considered clean when no filter cake covers the disk.
7. Optimum soak time for the soak solution is established by measuring the effectiveness of the wash.

The calcium peroxide used in the examples is a commercially available peroxide available from FMC Corporation as Perme Ox. It has an active peroxide content of 60% minimum, and thus an active oxygen content of 13.3% minimum.

In these examples and throughout the specification, the following abbreviations may be used: API=American Petroleum Institute RP13B; °C.=degrees centigrade; kg=kilogram; %=percent; m=meter; mm=millimeter.

EXAMPLE 1

A completion fluid containing 128.5 kg/m$^3$ of sized sodium chloride bridging particles, 3.1 kg/m$^3$ of xanthan gum biopolymer, and 12 kg/m$^3$ of an epichlorohydrin crosslinked hydropropyl starch derivative in a saturated sodium chloride brine was used to prepare filter cakes as disclosed hereinabove.

A soak solution having a pH of 6.9 containing 17.1 kg/m$^3$ calcium peroxide and 42.4 kg/m$^3$ sulfamic acid in a saturated sodium chloride brine was heated to the desired soaking temperature of 65.55° C. The filter cake was soaked in this solution for one hour and then transferred to the wash solution. The filter cake was completely removed within 15 minutes.

EXAMPLE 2

Example 1 was repeated except that the soak solution additionally contained 0.001% by weight ferrous ion, added as ferrous ammonium sulfate. The filter cake was completely removed within 5 minutes.

EXAMPLE 3

Example 2 was repeated except that the soak solution contained 8.57 kg/m$^3$ calcium peroxide, 21.1 kg/m$^3$ sulfamic acid and 0.0015% by weight ferrous ion, and had a pH of 1.8. The filter cake was completely removed within 5 minutes.

EXAMPLE 4

A filter cake was prepared as in Example 1. A soak solution having a pH of 5.3 containing 14.3 kg/m$^3$ calcium peroxide, 32.8 kg/m$^3$ sulfamic acid, and 0.0015% by weight ferrous ion, added as ferrous ammonium sulfate, in a calcium chloride solution having a density of 1259 kg/m$^3$, was heated to the desired soaking temperature of 48.9° C. The filter cake was soaked in this solution for four hours and then transferred to the wash solution. The wash solution was a calcium chloride brine having a density of 1259 kg/m$^3$. The filter cake was completely removed within 5 minutes.

COMPARATIVE EXAMPLE A

The procedure of Examples 1–3 was repeated using as the soak solution a saturated sodium chloride solution. The filter cake was removed in 35 minutes; however, there remained a gelatinous film of the polysaccharide polymers on the surface of the disk.

EXAMPLE 5

Example 1 was repeated except that the soak solution had a pH of 1.7 and contained 35.7 kg/m$^3$ of sulfamic acid, the soaking temperature was 48.9° C., and the soaking time was four hours. The filter cake was completely removed within 5 minutes.

EXAMPLE 6

Example 4 was repeated except that the soak solution contained as the activator 5 kg/m$^3$ of solution comprising 50% by weight ethyleneglycol monobutylether and 50% by weight dipropyleneglycol in place of the ferrous ammonium sulfate. The filter cake was completely removed in five minutes.

What is claimed is:

1. A method for removing the filter cake from the surface of a hydrocarbon-containing subterranean formation, the filter cake comprising bridging particles and at least one polysaccharide polymer, which comprises contacting the filter cake with a solution comprising an aqueous brine, a peroxide selected from the group consisting of alkaline earth metal peroxides, zinc peroxide, and mixtures thereof, and an acidic substance to provide the soak solution with a pH in the range from about 1 to about 8, for a period of time at least sufficient to decompose the polysaccharide polymers therein to such an extent that the filter cake forms a loosely adherent mass on the surface of the formation, and thereafter contacting the filter cake with a wash solution in which the bridging particles are soluble to remove the remaining filter cake solids.

2. The method of claim 1 wherein the bridging solids within the filter cake are water soluble, wherein the aqueous brine in the soak solution is saturated with respect to the water soluble bridging material, and wherein the wash solution comprises an aqueous liquid which is unsaturated with respect to the water soluble bridging material.

3. The method of claim 1 wherein the peroxide is calcium peroxide.

4. The method of claim 1, 2, or 3 wherein the soak solution contains a soluble activator to enhance the rate of reaction between the peroxide and the polysaccharide polymer.

5. The method of claim 4 wherein the soluble activator is selected from the group consisting of (1) a source of a cation selected from the group consisting of cobaltous, cuprous, ferrous, nickelous, manganous, and mixtures thereof; (2) organic hydroxyl compounds having the empirical formula:

$$HO—C_aH_{2a}—Z$$

where a is an integer from 1 to about 5, and Z is a radical selected from the group consisting of H, OH, and $(OC_bH_{2b})_nOR$ where b is 2, 3, or mixtures thereof, n is an integer from 0 to about 3, and R is a radical selected from the group consisting of H, $C_xH_{2x+1}$, and $C_yH_{2y+1}CO$, where x is an integer from 1 to 5 and y is an integer from 1 to 3; and mixtures thereof.

6. The method of claim 4 wherein the soak solution contains from about 2.8 kg/m³ to about 57 kg/m³ of the peroxide.

7. The method of claim 1, 2, or 3 wherein the soak solution contains from about 2.8 kg/m³ to about 57 kg/m³ of the peroxide.

8. A composition for decomposing polysaccharide polymers contained within filter cakes on the sides of a borehole, the filter cake containing at least one polysaccharide polymer and bridging particles, which comprises an aqueous brine in which the bridging particles are not appreciably soluble, an alkaline earth metal peroxide in an amount from about 2.8 kg/m³ to about 57 kg/m³, a soluble activator to enhance the rate of decomposition of the polysaccharide, and an acidic substance to provide the composition with a pH in the range from about 1 to about 8.

9. The composition of claim 8 wherein the aqueous brine is a solution which is saturated with respect to the bridging particles, and wherein the activator is selected from the group consisting of (1) a source of cation selected from the group consisting of cobaltous, cuprous, ferrous, nickelous, manganous, and mixtures thereof; (2) organic hydroxyl compounds having the empirical formula:

$$HO—C_aH_{2a}—Z$$

where a is an integer from 1 to about 5, and Z is a radical selected from the group consisting of H, OH, and $(OC_bH_{2b})_nOR$ where b is 2, 3, or mixtures thereof, n is an integer from 0 to about 3, and R is a radical selected from the group consisting of H, $C_xH_{2x+1}$, and $C_yH_{2y+1}CO$, where x is an integer from 1 to 5 and y is an integer from 1 to 3; and mixtures thereof.

10. The composition of claim 9 wherein the activator is an organic hydroxyl compound.

11. The composition of claim 8 or 9 wherein the acid is sulfamic and wherein the peroxide is calcium peroxide.

* * * * *